United States Patent
Amin et al.

(10) Patent No.: US 7,561,380 B2
(45) Date of Patent: *Jul. 14, 2009

(54) TRANSDUCING HEAD INCLUDING A MAGNETIC ELEMENT EXHIBITING VARYING PERMEABILITY

(75) Inventors: Nurul Amin, Woodbury, MN (US); Yuming Zhou, Lakeville, MN (US); Kaizhong Gao, Bloomington, MN (US); Patrick J. Ryan, St. Paul, MN (US); Steven Kalderon, Minneapolis, MN (US); Song S. Xue, Edina, MN (US); Shaoping Li, Naperville, IL (US); Mark T. Kief, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/100,761

(22) Filed: Apr. 10, 2008

(65) Prior Publication Data
US 2008/0186636 A1    Aug. 7, 2008

Related U.S. Application Data

(63) Continuation of application No. 10/671,809, filed on Sep. 26, 2003, now Pat. No. 7,382,575.

(51) Int. Cl.
*G11B 5/31* (2006.01)
*G11B 5/11* (2006.01)
*G11B 5/265* (2006.01)
*G11B 5/39* (2006.01)

(52) U.S. Cl. .............. 360/125.26; 360/125.16; 360/317; 360/319

(58) Field of Classification Search ............ 360/125.16, 360/125.26, 317, 319
See application file for complete search history.

(56) References Cited

U.S. PATENT DOCUMENTS

| 4,873,599 | A | 10/1989 | Sueoka |
| 5,168,409 | A * | 12/1992 | Koyama et al. ............. 360/317 |
| 6,025,978 | A | 2/2000 | Hoshi et al. |
| 6,177,207 | B1 | 1/2001 | Koike |
| 7,382,575 | B2 * | 6/2008 | Amin et al. ............ 360/125.16 |

FOREIGN PATENT DOCUMENTS

| JP | 61204813 A | * | 9/1986 |
| JP | 04221410 A | * | 8/1992 |
| SU | 1064301 A | * | 12/1983 |

OTHER PUBLICATIONS

English translation of SU 1064301 A, published Dec. 30, 1983 to Rozodinov et al.*
English translation of JP 04-221410 A, published Aug. 11, 1992 to Morita et al.*

* cited by examiner

*Primary Examiner*—Craig A Renner
(74) *Attorney, Agent, or Firm*—Kinney & Lange, P.A.

(57) ABSTRACT

A transducing head has a main pole and at least one magnetic element (such as a return pole or a shield) which provides a potential return path for a magnetic field produced by the main pole. The magnetic element is spaced from the main pole. The magnetic element has a first edge closest to the main pole and a second edge furthest from the main pole. Permeability of the magnetic element increases from the first edge to the second edge.

12 Claims, 4 Drawing Sheets

TRANSDUCING HEAD INCLUDING A MAGNETIC ELEMENT EXHIBITING VARYING PERMEABILITY

CROSS-REFERENCE TO RELATED APPLICATION(S)

This application is a continuation of and claims priority from U.S. patent application Ser. No. 10/671,809, filed Sep. 26, 2003 entitled "TRANSDUCING HEAD INCLUDING A MAGNETIC ELEMENT EXHIBITING VARYING PERMEABILITY" by Nurul Amin et al.

BACKGROUND

The present invention relates generally to the field of magnetic data storage and retrieval systems. More particularly, the present invention relates to a transducing head having a perpendicular writer portion in which side-writing is reduced significantly as compared to existing transducing head designs.

A transducing head of a magnetic data storage and retrieval system typically includes a writer portion for storing magnetically-encoded data on a magnetic medium and a reader portion for retrieving the magnetically-encoded data stored on the magnetic medium. The reader portion is positioned adjacent the writer portion. The writer portion may be a perpendicular writer or a longitudinal writer. In either case, the general structure of the writer is similar, although the actual operation and dimensions of its elements will differ substantially. In a longitudinal writer, the poles are commonly referred to as a bottom pole and a top pole, whereas in a perpendicular writer, the poles are commonly referred to as a return pole and a main pole. Longitudinal writing differs from perpendicular writing in that bits are written to a magnetic medium in a direction substantially parallel to a surface of the magnetic medium, rather than in a direction substantially normal to the surface of the medium. Perpendicular writers are utilized in order to obtain higher areal density.

A perpendicular writer is typically formed of a main pole, a back via, a return pole, a write gap, and one or more conductive coil layers. A main pole may also be known as a "write pole," and a return pole may also be known as an "auxiliary pole." The main pole and return pole are separated from each other at an air bearing surface (ABS) of the perpendicular writer portion by the write gap and are connected to each other at a region away from the ABS by the back via. The ABS is the surface of the transducing head immediately adjacent a magnetic medium. Positioned between the main pole and the return pole are the conductive coil layers encapsulated by insulating layers, which generally wrap around the back via. The main pole, back via, and return pole are each made of magnetic material. The write gap is generally a layer formed of nonmagnetic material.

The reader portion is typically formed of a bottom reader shield, a top reader shield and a magnetoresistive (MR) sensor positioned between the bottom and top reader shields. The top shield is the shield closest to the writer portion. Insulating layers are positioned between the MR sensor and the reader shields. The writer portion and reader portion are often arranged in a merged configuration in which a shared pole serves as both the top reader shield in the reader portion and a return pole in the writer portion.

A magnetic medium for perpendicular recording is generally formed of three layers: a medium layer having high perpendicular anisotropy, a nonmagnetic interlayer, and a soft magnetic underlayer (SUL) having high permeability. A perpendicular writer portion is positioned to write data in track on the magnetic medium, which is rotated at a high speed. The transducing head is supported over a surface of the magnetic medium by a thin cushion of air produced by the high rotation speed. This surface is the ABS referenced earlier.

In order to write to the magnetic medium, a time-varying electrical current, also known as a write current, is caused to flow through the conductive coils layers of the perpendicular writer. The write current produces a time-varying magnetic field through the main and return poles. The main pole and return pole assume opposite magnetic charges at any instant for a given write current, thus the magnetic field links from the main pole to the return pole, or vice versa. The magnetic medium is passed near the ABS of the transducing head at a predetermined distance such that a magnetic surface of the medium passes through the magnetic field. The main pole is generally the trailing pole of the main and return poles, thus the main pole is used to physically write the data to the magnetic medium. Accordingly, it is the main pole that defines the track width of the written data. More specifically, the track width is defined by the width of the main pole at the ABS.

The SUL of the magnetic medium essentially acts as a third pole of the writer, imaging the magnetic field emanating from the main pole. The magnetic field bridges the gap from the main pole to the SUL, passing through the medium layer, and then subsequently bridges the gap between the SUL and the return pole, again passing through the medium layer. The latter portion is known as the return path. Data is written to the magnetic medium as the magnetic field, having a magnetic field value larger than the coercive force of the magnetic medium, passes through the medium layer from the main pole. The magnetization in the magnetic medium is held in a direction substantially normal to the surface of the magnetic medium.

The return pole is substantially larger than the main pole at the ABS to help prevent the magnetic field from writing or erasing data on the return path. That is, the magnetic flux through the medium layer in the return path should not be concentrated sufficiently to overcome the coercive force of the medium. By making the return pole substantially larger than the main pole at the ABS, the magnetic flux density in the return path is decreased.

The reader portion of the transducing head functions to retrieve magnetically-encoded data stored on a magnetic medium. When the transducing head is placed near the magnetic medium, a resistance of the MR sensor fluctuates in response to a magnetic field emanating from written transitions in the magnetic medium. By providing a sense current through the MR sensor, the resistance of the sensor can be measured and used by external circuitry to decipher the information stored on the magnetic medium. The reader shields function to absorb any stray magnetic fields emanating from adjacent tracks on the magnetic medium or neighboring magnetic bits on the same track so that the MR sensor will read only information stored directly beneath it on a specific track of the magnetic medium.

In recent years, writer portion widths and reader portion widths have been decreased to accommodate ever-increasing areal densities of magnetic storage. Perpendicular recording allows for higher linear bit density as compared to longitudinal recording because the bits are written to the magnetic medium in a direction substantially normal to the surface of the medium, rather than substantially parallel to the surface of the medium as in parallel recording.

A perpendicular recording system requires a medium with a SUL of high permeability as a result large magnetic field appearing at a trailing edge of the return pole during the write process. The trailing edge of the return pole is the edge closest to the main pole. The large magnetic field at the trailing edge of the return pole results from the magnetic field concentrating itself at the trailing edge of the return pole during the return path. In addition, the trailing edge of other magnetic elements of the transducing head, such as the reader shields, may generate a large magnetic field, caused by stray magnetic fields emanating from the return path. The large magnetic field generated at the trailing edge of the return pole or the reader shield is generally known as the erasure field. The erasure field can be large enough to erase or write over previously written neighboring tracks on the magnetic medium by destabilizing the medium magnetization configuration or write over the previously written tracks by reorienting the previously defined magnetization pattern. The erasure field activity is generally known as "side-writing." Transducing heads that reduce or minimize side writing are desirable. Thus, there is a need for a transducing head design which reduces side-writing.

SUMMARY

The present invention is a transducing head having a main pole and at least one magnetic element (such as a return pole or reader shields) spaced from the main pole, which provides a potential return path for a magnetic field. The magnetic element has a first edge closest to the main pole and a second edge furthest from the main pole. Permeability of the magnetic element increases from the first edge to the second edge.

In a preferred embodiment, the magnetic element is formed of a plurality of layers, where a ratio of permeability between adjacent layers is approximately constant.

DETAILED DESCRIPTION

The present invention recognizes that side writing at a trailing edge of a magnetic element of a transducing head is reduced by varying permeability of magnetic material forming the magnetic element, with a lowest permeability at a trailing edge of the magnetic element and a highest permeability at a leading edge of the magnetic element. The magnetic element is any element of the transducing head that provides a potential return path for a magnetic field produced by the main pole, and may be a shared pole, or in the case that a transducing head is not arranged in a merged configuration, the magnetic element may be a return pole or reader shield. Performance of a main pole of the perpendicular writer is not substantially effected by varying permeability of the magnetic element. The concept of the present invention may be applied in any perpendicular writer having a main pole and at least one return pole, as exemplified herein in detail, without any suggestion of limiting or restricting of the application of the present invention to the particular types of perpendicular writers illustrated in the examples. Similarly, the present invention may be applied to any return pole shape, such as a rectangular, elliptical, or round.

In the present invention, the term "main pole," "top pole," and "write pole" are used interchangeably to refer to a part of a perpendicular writer which actually writes on a magnetic medium as illustrated herein. The terms "return pole" and "shared pole" are used to refer to the magnetic pole opposing the main pole and forming a part of magnetic flux path as illustrated herein.

Figure 1:
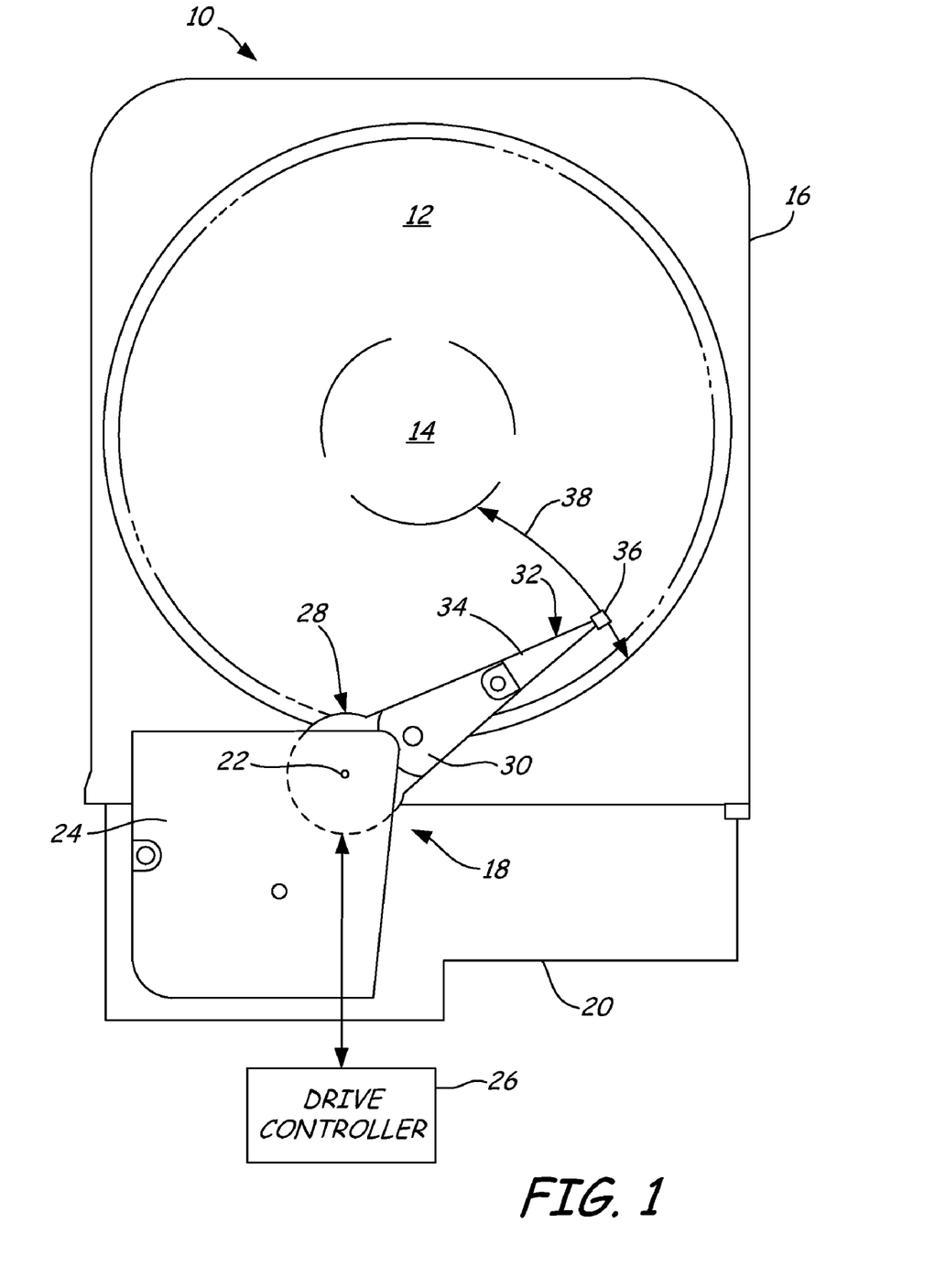
FIG. 1 is a top view of typical disc drive system employing a transducing head having a perpendicular writer portion and a reader portion.

FIG. 1 is a top view of typical disc drive system 10 employing a transducing head having a perpendicular writer and reader portion. Disc drive system 10 includes magnetic medium 12 mounted for rotational movement about an axis defined by spindle 14 within housing 16. Disc drive system 10 also includes actuator 18 mounted to base plate 20 of housing 16, with actuator 18 being pivotally movable relative to disc 12 about axis 22. Cover 24 covers a portion of actuator 18. Drive controller 26 is coupled to actuator 18. Drive controller 26 is either mountable within disc drive system 10 or is located outside of disc drive system 10 with suitable connection to actuator 18. Actuator 18 includes e-block assembly 28, actuator arm 30 and head suspension assembly 32. Head suspension assembly 32 includes load beam 34 coupled to actuator arm 30 and air bearing slider 36 coupled to load beam 34 by a flexure. Slider 36 carries a transducing head, which has a reader portion, such as an MR head, for reading information from disc 12 and a perpendicular writer for encoding data on disc 12.

During operation, drive controller 26 receives position information indicating a location on disc 12 to be accessed. Based on the position information, drive controller provides a position signal to actuator 18, which causes actuator 18 to pivot about axis 22. The movement causes slider 36 to move radially over the surface of disc 12 in a path indicated by arrow 38. Drive controller 26 and actuator 18 operate in a known manner so that the transducer carried by slider 36 is positioned over the desired location of disc 12. Once the transducer is properly positioned, a desired read or write operation is performed by the transducing head.

Figure 2:
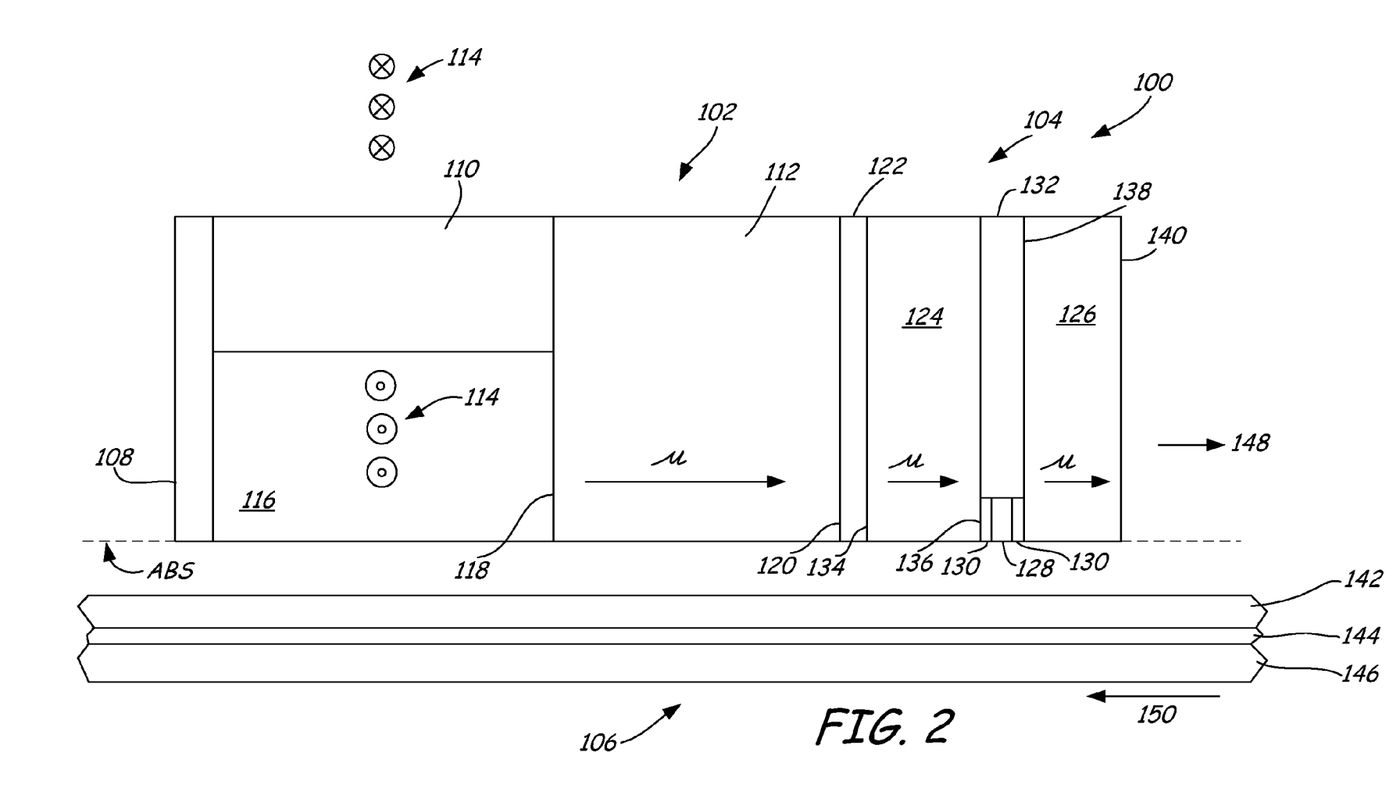
FIG. 2 is a cross-sectional view of a transducing head having a perpendicular writer portion and a reader portion in accord with the present invention, and a cross-sectional view of a magnetic medium.

FIG. 2 is a cross-sectional view of transducing head 100 having perpendicular writer portion 102 and reader portion 104, which are typically carried by a slider such as slider 36 described in FIG. 1, and a cross-sectional view of magnetic medium 106. Perpendicular writer portion 102 and reader portion 104 are in accord with the present invention.

Writer portion 102 of transducing head 100 comprises main pole 108, back via 110, return pole 112, conductive coil layers 114, and write gap 116. Main pole 108, back via 110, and return pole 112 are formed of magnetic material. Conductive coil layers 114 are formed of one or more conductive coil layers encapsulated by insulating layers (not shown). The insulating layers function to electrically insulate conductive coil layers 114 from main and return poles 108 and 112. Conductive coil layers 114 wrap around back via 110. However, the configuration of conductive coil layers 114 is not essential for the present invention. Any coil configuration effective for the purpose of producing a time-varying electrical current may be used in combination with the present invention. Main pole 108 and return pole 112 are separated from each other at an air bearing surface (ABS) of transducing head 100 by a write gap 116 and are connected to each other at a region away from the ABS by back via 110. The ABS of transducing head 100 is the surface immediately adjacent magnetic medium 106. Back via 110 functions to magnetically couple main pole 108 and return pole 112. Trailing edge 118 of return pole 112 is the edge of return pole 112 closest to main pole 108. Leading edge 120 of return pole 112 is the edge furthest from main pole 108.

Main pole 108 and back via 110 may be formed of Permalloy, or any other high moment magnetic material. Return pole 112 is formed of magnetic material such that permeability of return pole 112 increases in substantially the same direction as the direction of relative movement of transducing head 100 with respect to magnetic medium 106, with a highest permeability at leading edge 120 of return pole 112. Arrow 148 indicates the direction of relative movement of transducing head 100. Similarly, an arrow drawn on return pole 112 shows the direction that permeability (designated as μ) increases. Permeability of return pole 112 increases from trailing edge 118 to leading edge 120.

In an alternate embodiment, writer portion 102 has a second return pole (not shown) formed of magnetic material, where return pole 112 and the second return pole are positioned on opposite sides of main pole 108. The second return pole may have uniform permeability or varying permeability in a similar design as return pole 112, with lowest permeability at an edge closest to main pole 108 and highest permeability at an edge furthest from main pole 108. The second return pole is larger than main pole 108 at the ABS.

Perpendicular writer portion 102 and reader portion 104 are separated by gap layer 122. Gap layer 122 is formed of nonmagnetic nonconductive or insulating material. Reader portion 104 comprises top and bottom reader shields 124 and 126, magnetoresistive (MR) sensor 128, insulating layers 130, and gap layer 132. Reader portion 104 may be formed adjacent writer portion 102 or arranged in a merged configuration with writer portion 102 in which a shared pole (not shown) serves as both top reader shield 124 and return pole 112. Gap layer 122 is not necessary when writer portion 102 and reader portion 104 are arranged in a merged configuration. Trailing edges 134 and 138 of top and bottom reader shields 124 and 126, respectively, are the edges of top and bottom reader shields 124 and 126 closest to main pole 108. Leading edges 136 and 140 of top and bottom reader shields 124 and 126, respectively, are the edges of top and bottom reader shields 124 and 126 furthest from main pole 108.

MR sensor 128 is a multilayer device operable to sense magnetic fields from magnetic medium 106. MR sensor 128 may be any one of a plurality of MR-type sensors, including, but not limited to, AMR (anisotropic magnetoresistive), GMR (giant magnetoresistive), and TMR (tunnel magnetoresistive). At least one layer of MR sensor 128 is a sensing layer, such as a free layer of a GMR spin valve sensor, that requires longitudinal biasing. Top and bottom reader shields 124 and 126 are formed of magnetic material, and may be formed of the same materials as return pole 112, but it is not necessary to the operation of transducing head 100. Thus, top and bottom reader shields 124 and 126 may be formed of magnetic material such that permeability of top and bottom reader shields 124 and 126 increases from trailing edge 134 and 138 to leading edge 136 and 140, respectively. Arrows drawn on top and bottom reader shields 124 and 126 show the direction permeability (designated as μ) increases. In an alternate embodiment, top and bottom reader shields 124 and 126 may be formed of Permalloy. Insulating layers 130 are formed of nonmagnetic material and function to magnetically insulate MR sensor 128 from top and bottom reader shields 124 and 126. Gap layer 132 is formed of nonmagnetic material and functions to separate top and bottom shields 124 and 126.

Magnetic medium 106 comprises medium layer 142, interlayer 144, and soft underlayer (SUL) 146, and is generally used for perpendicular recording. Medium layer 142 is formed of a material having a high perpendicular anisotropy. Interlayer 144 is formed of a nonmagnetic material. SUL 146 is formed of a material having a high permeability.

To write data to magnetic medium 106, a time-varying electrical current, also known as the write current, is caused to flow through conductive coil layers 114. The write current produces a time-varying magnetic field through main pole 108. The magnetic field has a maximum (also known as peak) value greater value than the coercive force of medium layer 142. A thin cushion of air is produced as transducing head 100 is positioned over magnetic medium 106, which is rotated at appropriate (or predetermined) high speed. The thin cushion of air supports transducing head 100 over magnetic medium 106. Magnetic medium 106 is passed near the ABS of transducing head 100 at a predetermined distance, such that medium layer 142 is passed through the time-varying magnetic field. Arrow 150 indicates the direction of movement of magnetic medium 106.

SUL 146 essentially acts as a third pole of transducing head 100, imaging the magnetic field emanating from the main pole. That is, the time-varying magnetic field bridges the gap from main pole 108 to SUL 146, passing through medium layer 142, and then subsequently bridges the gap from SUL 146 to return pole 112, passing through medium layer 142 again. This path will generally be referred to as the magnetic flux path, and the latter portion, the magnetic flux path between SUL 146 and return pole 112, will be referred to as the return path. The return path is part of the magnetic flux path. As the magnetic field from main pole 108 passes through medium layer 142, medium layer 142 is magnetized in a direction determined by the magnetic field direction, and data is stored. The easy-axis of magnetization in magnetic medium 106 is in a direction normal to a surface of magnetic medium 106. Ideally, medium layer 142 is not magnetized by the magnetic field during the return path because the magnetic field spreads over an area of return pole 112 that is substantially parallel to the ABS of the transducing head ("thickness"). The thickness of the return pole is measured along the direction of relative movement of the transducing head. Return pole 112 is substantially larger than main pole 108 at the ABS.

A magnetic field will generally travel a path with the least magnetic resistance ("reluctance"). If a first magnetic material A has a higher permeability than a second magnetic material B, then first material A will have less resistance to a magnetic field than second material B and will conduct the same magnetic flux density more easily than second material B. Permeability is a measure of a material's ability to acquire high magnetization in a relatively weak magnetic field. Thus, the higher the permeability of a material, the easier the material will conduct a magnetic field. Generally, a return pole formed of first material A will write more efficiently than a return pole formed of second material B because first material A has lower resistance to conducting a magnetic field and hence attracts more field and consequently acquires high magnetization.

By design, a trailing edge of a prior art return pole may generate a large magnetic field during the writing process. The large magnetic field at the trailing edge of the prior art return pole results from a magnetic field concentrating at the trailing edge of the return pole during the return path, rather than spreading out over the thickness of the return pole. A large magnetic field may also form at a trailing edge of another magnetic element of a transducing head that provides a potential return path for a magnetic field emanating from the main pole, such as a top or bottom reader shield. The concentration of the magnetic field at the trailing edge of the return pole or other magnetic element contributes to the problem of side-writing, because the magnetic field at the trailing edge may be of such a magnitude as to overcome the coercive force of a magnetic medium, and may thus erase or write over previously written tracks. That is, the concentrated magnetic field at the trailing edge of a magnetic element will erase or write over areas of the magnetic medium immediately adjacent the ABS of the trailing edge of the magnetic element.

The magnetic field may crowd around a trailing edge of a return pole while completing a magnetic flux path and create a large magnetic field because the trailing edge is the first portion of the transducing head that has the least resistance during the return path. The magnetic field is attracted to the shortest path and the path with the least resistance. Ideally, the magnetic field would spread itself across the entire thickness of the return pole while completing the magnetic flux path, in which case, the magnetic field at the trailing edge of the return pole would not be of such a magnitude as to overcome the coercive force of magnetic medium, and side-writing would not result. However, this is generally not the case. The magnetic field crowding around the trailing edge of other magnetic elements of the transducing head may be caused by stray magnetic fields emanating from the return path. This may also contribute to the side-writing problem. Thus, there is a need for a magnetic element design which does not cause crowding of the magnetic field at the trailing edge of the magnetic element. The magnetic element may be a return pole, reader shield, or any other magnetic element of a transducing head that provides a potential return path for a magnetic field emanating from the main pole.

The present invention recognizes the potential problems of a return pole formed of a material having uniform permeability. A return pole having uniform permeability may contribute to the crowding of a magnetic field around the trailing edge of the return pole. Assuming a transducing head having the same structure as transducing head 100, if a return pole is formed of a material having uniform permeability, the trailing edge of the return pole will be formed of the same material as the leading edge furthest from the main pole. The magnetic flux path with the least resistance is between an SUL of a magnetic medium and the trailing edge of the return pole. The magnetic field will not spread across the thickness of the return pole because that would not be a path with the least resistance. Air has greater resistance to a magnetic field than magnetic material forming the return pole, and in order for the magnetic field to spread across the thickness of the return pole, the magnetic field has to travel through more air than if the magnetic field were to crowd at the trailing edge of the return pole. Thus, the magnetic field will crowd around the trailing edge of the return pole having uniform permeability.

The present invention also recognizes that if permeability of any magnetic element that can potentially provide a return path for a magnetic field, such as a return pole or a reader shield, gradually increases, with lowest permeability at a trailing edge and highest permeability at a leading edge, crowding of the magnetic field at the trailing edge of the magnetic element will be minimized, and any peak value of a magnetic field completing its flux path through the magnetic element will not be of sufficient value to contribute to side-writing. By reducing a peak magnetic field that flows through the magnetic element during a return path to below an coercive force of the magnetic medium, side-writing will be reduced.

Different methods are used to continuously vary permeability of the magnetic element. One method is continuously varying the composition of magnetic material during the deposition process or by varying the sputtering or plating conditions. Magnetic material may be deposited using plating or sputtering methods known in the art. Another method of varying the permeability of the magnetic element is depositing a plurality of layers of magnetic material, with each succeeding material having greater permeability than the previously deposited material. A ratio of permeability between adjacent layers should remain approximately constant, in order for the permeability to gradually increase. The layers may be deposited using plating or sputtering methods known in the art.

Figure 3:
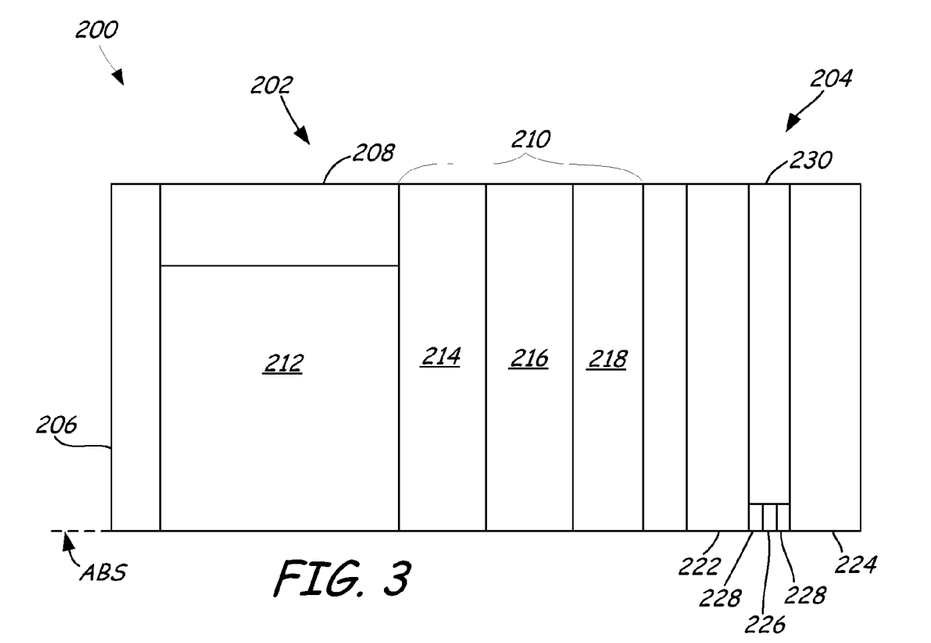
FIG. 3 is a cross-sectional view of a first embodiment of a transducing head in accord with the present invention.

FIG. 3 is a cross-sectional view of a first embodiment of transducing head 200 in accord with the present invention. Transducing head 200 is comprised of writer portion 202 and reader portion 204. Writer portion comprises main pole 206, back via 208, return pole 210, write gap 212, and conductive coil layers (not shown). Main pole 206 and return pole 210 are separated from each other at an ABS of transducing head 200 by write gap 212 and connected to each other at a region away from the ABS by back via 208. Conductive coil layers (not shown) wrap around back via 208. Return pole 210 is formed of three layers of magnetic material, first layer 214, second layer 216, and third layer 218.

An edge of first layer 214 forms a trailing edge of return pole 210, that is, the edge closest to main pole 206, which is the trailing pole. In addition, first layer 214 is formed of magnetic material having a lower permeability than second layer 216. An edge of third layer 218 forms a leading edge of return pole 210. Permeability of return pole 210 increases from first layer 214 to third layer 218. Permeability of third layer 218 is greater than permeability of second layer 216, which is greater than permeability of first layer 214. A ratio of the permeability of first layer 214 to the permeability of second layer 216 is approximately the same as a ratio of the permeability of second layer 216 to third layer 218. First layer 214, second layer 216, and third layer 218 may be deposited by plating or sputtering methods known in the art.

In an alternate embodiment, writer portion 202 has a second return pole (not shown) formed of magnetic material, where return pole 210 and the second return pole are positioned on opposite sides of main pole 206. The second return pole may be formed of a single layer of magnetic material or may be formed of the same three layers as return pole 210 in order to minimize any potential side-writing problems. If the second return pole is formed of the same three layers as return pole 210, first layer 214 is closest to main pole 108 and third layer 218 is furthest from main pole. The second return pole is larger than main pole 108 at the ABS.

Reader portion 204 comprises top and bottom reader shields 222 and 224, MR sensor 226, insulating layer 228, and gap layer 230. Top and bottom reader shields 222 and 224 may be single layers or may be formed of the same three layers as return pole 210 in order to minimize any potential side-writing problems.

The write process for transducing head 200 is similar to the one described with respect to transducing head 100 in FIG. 2. A magnetic field flowing through main pole 206 will complete its magnetic flux path using return pole 210. With the return pole configuration shown in FIG. 3, the magnetic field will complete its path using the thickness of return pole 210, rather than just a trailing edge of return pole 210, because the magnetic field will complete a flux path using a path having the least resistance. The magnetic field will first begin its return path through first layer 214, but then will spread out and flow through second and third layers 216 and 218 because second and third layers 216 and 218 have higher permeability and lower resistance to the magnetic field. Thus, a magnetic field will not concentrate at the trailing edge of return pole 210 and a peak magnetic field flowing through return pole 210 will not be of sufficient value to overcome an coercive force of a magnetic medium, and side-writing will be reduced. If reader shields 222 and 224 also have multiple layers like return pole 210, they will minimize side-writing caused by reader shields 222 and 224 in a similar way. That is, a magnetic field will not concentrate at a trailing edge of top or bottom reader shield 222 or 224 because stray magnetic fields will complete its flux path using the thickness of the top or bottom reader shields.

Figure 4:
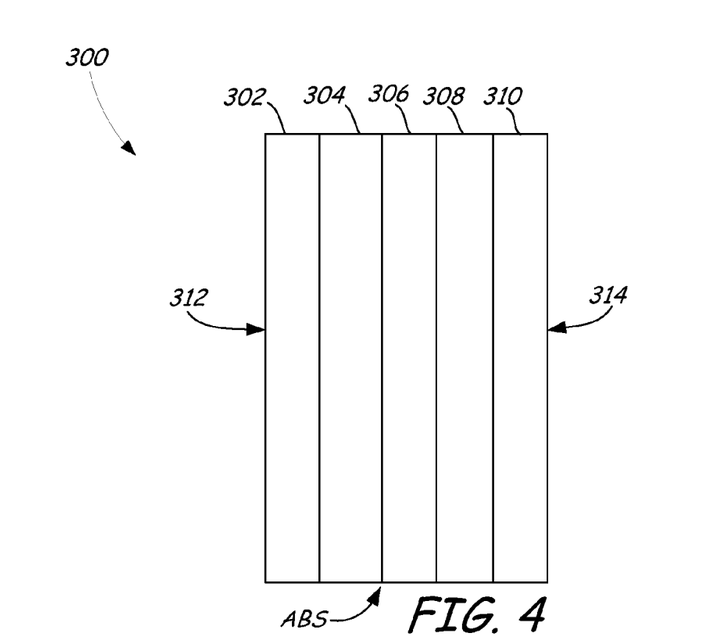
FIG. 4 is a cross-sectional view of a magnetic element in accord with the present invention.

FIG. 4 is a cross-sectional view of magnetic element 300 in accord with the present invention. Magnetic element 300 is any part of a transducing head that provides a potential return path for a magnetic field emanating from a main pole, such as a return pole or a reader shield. FIG. 4 is shown to aid the reader in understanding the relationship of the permeability ratios of the layers may form magnetic element 300. Although FIG. 4 depicts five layers of similar thickness, magnetic element 300 may be formed any number of layers of similar or different thickness. Magnetic element 300 is formed of first layer 302, second layer 304, third layer 306, fourth layer 308, and fifth layer 310. Layers 302, 304, 306, 308, and 310 are formed of magnetic material. Trailing edge 312 of magnetic element 300 is an edge of first layer 302, and leading edge 314 of magnetic element 300 is an edge of fifth layer 310.

Permeability of magnetic element 300 is increasing in a direction moving away from trailing edge 312 of magnetic element 300, with lowest permeability at first layer 302, and greatest permeability at fifth layer 310. In addition, an approximately constant ratio of permeability between adjacent layers is desired. That is, looking at FIG. 4, a ratio of permeability of first layer 302 to permeability of second layer 304 is approximately the same as a ratio of permeability of second layer 304 to permeability of third layer 306, which is approximately the same as a ratio of permeability of third layer 306 to permeability of fourth layer 308, which is approximately the same as a ratio of permeability of fourth layer 308 to permeability of fifth layer 310. Otherwise stated, the permeability of fifth layer 310 is greater than the permeability of fourth layer 308, which is greater than the permeability of third layer 306, and so forth.

With the magnetic element configuration shown in FIG. 4, a magnetic field will complete its path using the thickness of magnetic element 300, rather than just trailing edge 312 of magnetic element 300, because the magnetic field will complete a magnetic flux path using a path having the least resistance. Fifth layer 310 has the highest permeability and conducts the magnetic field with less resistance than first layer 302. Magnetic element 300 conducts the magnetic field with less resistance than air, thus the magnetic field will begin completing its flux path using trailing edge 312 of magnetic element 300. The magnetic field will begin completing its flux path through first layer 302, second layer 304, third layer 306, and fourth layer 308. However, because the flux path having the least resistance requires the magnetic field to flow through fifth layer 310, there will no longer be crowding of the magnetic field at trailing edge 312 of magnetic element 300, and as a result, a peak magnetic field value at trailing edge 312 of magnetic element 300 will be minimized. In addition, a peak magnetic field value at any point at the ABS of magnetic element 300 will be lower than if magnetic element 300 were formed of a material having a uniform permeability.

Although FIGS. 3 and 4 show a magnetic element having a gradually increasing permeability achieved through utilizing multiple layers of material, other means may be used to achieve a magnetic element having an increasing permeability. Other means may include continuously varying the composition of the magnetic element using sputtering or plating methods known in the art to create a continuously varying permeability.

Figure 5:
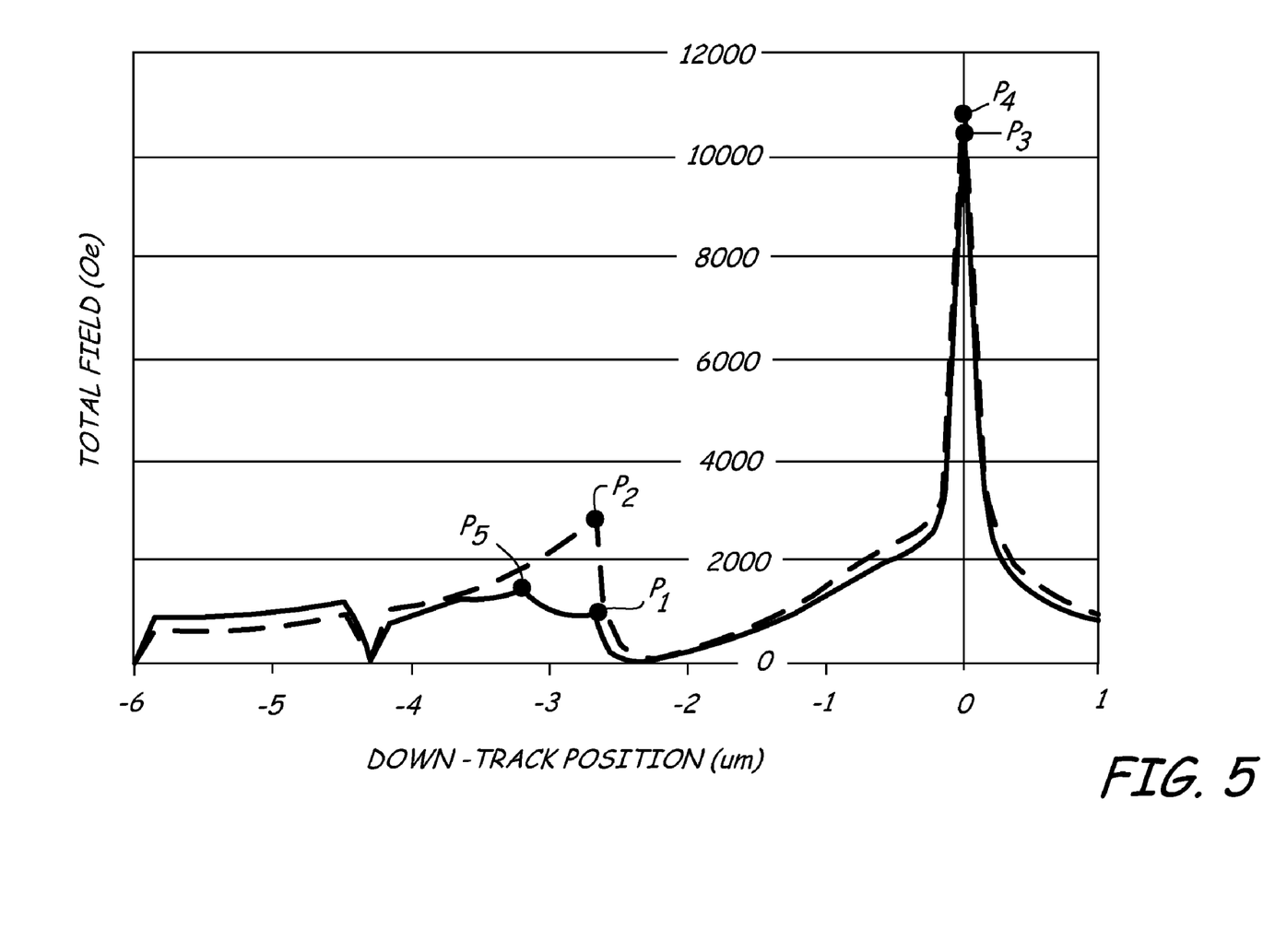
FIG. 5 is a graph illustrating a profile of an absolute value of a magnetic field formed by a perpendicular write head having a return pole in accord with the present invention and a profile of a magnetic field formed by a perpendicular write head having a return pole having uniform permeability.

FIG. 5 is a graph illustrating a profile of an absolute value of a magnetic field formed by a perpendicular write head having a return pole in accord with the present invention and a profile of a magnetic field formed by a perpendicular write head having a return pole having uniform permeability. The profile is taken along the cross-sectional view of a perpendicular write head, similar to the views shown in FIGS. 2 and 3, using a Finite Element Method. In FIG. 5, the absolute value of the total magnetic field formed by a perpendicular write head is plotted as a function of the down track position. The solid line represents a magnetic field formed by the write head with the return pole in accord with the present invention. The dashed line represents a magnetic field formed by the write head with the return pole having a uniform permeability. Peak $P_1$ is an absolute value of a magnetic field at a trailing edge of the return pole in accord with the present invention. Peak $P_3$ is an absolute value of a magnetic field at a main pole of the write head having the return pole in accord with the present invention. Peak $P_2$ is an absolute value of a magnetic field at a trailing edge of the return pole having a uniform permeability. Peak $P_4$ is an absolute value of a magnetic field at a main pole of the write head with the return pole having a uniform permeability.

As FIG. 5 shows, $P_1$ is less than $P_2$, demonstrating that the return pole design in accord with the present invention reduces a peak magnetic field at a trailing edge of a return pole. A lower magnetic field at a trailing edge of a return pole helps eliminate side-writing. $P_1$ should be reduced to below the coercive force of a magnetic medium being used in order to reduce side-writing. In addition, FIG. 5 shows that the magnetic field along the return pole in accord with the present invention is spread more evenly over a thickness of a return pole as compared to the return pole having a uniform permeability. In addition, a peak value $P_5$ of a magnetic field generated along the return pole in accord with the present invention is lower than the peak value $P_2$ of a magnetic field generated along the return pole having a uniform permeability. $P_3$ and $P_4$ are substantially the same value, demonstrating that varying the permeability of a return pole does not affect the peak magnetic field emanating from a main pole.

Although the present invention has been described with reference to preferred embodiments, workers skilled in the art will recognize that changes may be made in form and detail without departing from the spirit and scope of the invention.

The invention claimed is:

1. A transducing head configured to write data to a magnetic medium, the transducing head comprising:
   a main pole configured for producing a magnetic field that causes perpendicular writing of data to the magnetic medium; and
   at least one magnetic element spaced from and having a greater thickness than the main pole, wherein the magnetic element provides a potential return path for the magnetic field produced by the main pole, and is formed of at least three layers, each succeeding layer having greater permeability, with a highest permeability at an edge of the magnetic element furthest from the main pole, and an approximately constant ratio of permeability between adjacent layers.

2. The transducing head of claim 1, wherein the magnetic element is a return pole.

3. The transducing head of claim 1, wherein the magnetic element is a reader shield.

4. The transducing head of claim 1, wherein the main pole is formed of magnetic material.

5. The transducing head of claim 1, wherein the magnetic element is formed of five layers, each succeeding layer having greater permeability, with a highest permeability at an edge of the magnetic element furthest from the main pole, and an approximately constant ratio of permeability between adjacent layers.

6. A disc drive comprising:
a magnetic medium;
a transducing head configured to write data to the magnetic medium, the transducing head comprising:
a main pole configured for producing a magnetic field that causes perpendicular writing of data to the magnetic medium; and
at least one magnetic element spaced from and having a greater thickness than the main pole, wherein the magnetic element provides a potential return path for the magnetic field produced by the main pole, and has a first edge closest to the main pole, a second edge furthest from the main pole, and wherein permeability of the magnetic element increases from the first edge to the second edge such that the magnetic field near the first edge is less than a coercive force of the magnetic medium and the magnetic field near the second edge is greater than the coercive force of the magnetic medium.

7. The disc drive of claim 6, wherein the magnetic element is formed of a plurality of layers, each succeeding layer having greater permeability.

8. The disc drive of claim 7, wherein a ratio of permeability between adjacent layers is approximately constant.

9. The disc drive of claim 6, wherein the magnetic element is a return pole.

10. The disc drive of claim 9, wherein the return pole has a shape selected from the group consisting of rectangular, round, and elliptical.

11. The disc drive of claim 6, wherein the magnetic element is a reader shield.

12. The disc drive of claim 6, wherein the main pole is formed of magnetic material.

* * * * *